United States Patent
Fernandez

(10) Patent No.: US 6,322,699 B1
(45) Date of Patent: Nov. 27, 2001

(54) PROCESS FOR PURIFICATION OF WASTE WATERS AND CONTAMINANT SPILLS BASED ON THE USE OF CULTIVATED EMERGENT MACROPHYTES CONVERTED INTO FLOATING CULTURES

(75) Inventor: Jesus Fernandez, Madrid (ES)

(73) Assignee: Universidad Politecnica de Madrid, Madrid (ES)

( * ) Notice: Subject to any disclaimer, the term of this patent is extended or adjusted under 35 U.S.C. 154(b) by 0 days.

(21) Appl. No.: 09/194,432

(22) PCT Filed: Apr. 2, 1998

(86) PCT No.: PCT/ES98/00086

§ 371 Date: Jul. 23, 1999

§ 102(e) Date: Jul. 23, 1999

(87) PCT Pub. No.: WO98/45213

PCT Pub. Date: Oct. 15, 1998

(30) Foreign Application Priority Data

Apr. 4, 1997 (ES) .................................................. 9700706

(51) Int. Cl.⁷ ...................................................... C02F 3/32
(52) U.S. Cl. ............................... 210/602; 210/747; 47/59
(58) Field of Search .................................... 210/602, 620, 210/747, 170, 903, 906; 47/59, 62 C, 65, 64

(56) References Cited

U.S. PATENT DOCUMENTS

| | | | |
|---|---|---|---|
| 2,674,828 | * | 4/1954 | Tegner . |
| 3,770,623 | * | 11/1973 | Seidel . |
| 4,169,050 | * | 9/1979 | Serfling et al. . |
| 4,331,538 | * | 5/1982 | Kickuth . |
| 4,333,837 | * | 6/1982 | Plosz et al. . |
| 4,415,450 | * | 11/1983 | Wolverton . |
| 4,824,572 | * | 4/1989 | Scott . |
| 4,995,969 | * | 2/1991 | LaVigne . |
| 5,087,353 | * | 2/1992 | Todd et al. . |
| 5,096,577 | * | 3/1992 | Ngo et al. . |
| 5,337,516 | * | 8/1994 | Hondulas . |
| 5,393,426 | | 2/1995 | Raskin et al. . |
| 5,437,786 | * | 8/1995 | Horsley et al. . |
| 5,636,472 | * | 6/1997 | Spira et al. . |
| 5,733,453 | * | 3/1998 | DeBusk . |
| 5,736,047 | | 4/1998 | Ngo . |
| 5,766,474 | * | 6/1998 | Smith et al. . |
| 5,876,484 | * | 3/1999 | Raskin et al. . |

FOREIGN PATENT DOCUMENTS

| | | |
|---|---|---|
| 277 905 A1 | 4/1990 | (DD) . |
| 2129711 | 12/1972 | (DE) . |
| 30 11 276 A1 | 10/1981 | (DE) . |
| 3941211 | * 6/1991 | (DE) . |
| 0 405 571 A1 | 1/1991 | (EP) . |
| 63-209795 | * 8/1988 | (JP) . |
| 08-001188 | * 1/1996 | (JP) . |
| 08-033899 | * 2/1996 | (JP) . |
| 08-281291 | * 10/1996 | (JP) . |
| 09-029283 | * 2/1997 | (JP) . |
| WO93/06050 | 4/1993 | (WO) . |
| WO96/36568 | 11/1996 | (WO) . |

OTHER PUBLICATIONS

Henriques & Fernandez: "Metal uptake and distribution in rush (Juncus conglomeratus L.) plants growing in pyrites mine tailing at Lousal, Portugal" The Science of Total Environment, vol. 102, 1991, Amsterdam, Holanda, paginas 253–260, paginas 255, 258.

Stefani et al: "Juncus acutus: germination and initial growth in presence of heavy metals" Annales Bot, Fennici, vol. 28, 1991, Helsinki, Finlandia; paginas 37–43, paginas 40, 41.

* cited by examiner

Primary Examiner—David A. Simmons
Assistant Examiner—Fred Prince
(74) Attorney, Agent, or Firm—Clark & Brody

(57) ABSTRACT

A system for the purification of residual water and contaminated effluents is based on the use of aquatic plants and in particular emergent macrophytes that have been conditioned to float on the surface of a channel, duct, lagoon, or pond where contaminated water flows. The plants form a mantle floating on the water surface with the root system, rhizomes, and bases of the stems immersed. The immersed portion has a large specific surface to which an abundant microbial flora is fixed and of which the growth is enhanced by the oxygen pumped toward that area by the leaves. The assembly formed by the roots and the microorganism acts as a filter that eliminates the organic dissolved material in addition to mineral compounds (phosphorous and nitrogen, among others), which are absorbed mainly by the plants. Periodically the floating biomass can be easily removed and used for energy or industrial purposes.

11 Claims, No Drawings

PROCESS FOR PURIFICATION OF WASTE WATERS AND CONTAMINANT SPILLS BASED ON THE USE OF CULTIVATED EMERGENT MACROPHYTES CONVERTED INTO FLOATING CULTURES

TECHNICAL ASPECTS

This process is applicable to domestic and industrial wastewater treatment, treatment of eutrophicating effluents, treatment of effluents containing pollutants which can be removed by aquatic macrophytes.

PRIOR STATE OF THE ART

Conventional wastewater treatment processes are capable of removing organic matter by means of the sedimentation of the suspended solids during primary treatment and by means of microorganisms fixed to inert media or free in the water which are subjected to natural or artificial aeration in secondary treatment. The removal of mineral elements (tertiary treatment) is a highly expensive process if carried out using conventional processes (chemical precipitation), as a result of which a large majority of treatment plants do not avail of this type of treatment and discharge water rich in mineral elements, which contributes to the eutrophication of the watercourses and reservoirs (mainly due to the nitrogen and phosphorus involved). Environmental protection laws are becoming progressively more stringent with regard to requiring that the concentration of these elements in the waters discharged into public watercourses be lowered.

What are known as "Green Filter" treatment systems employ inert media such as peat or plant species grown in specific soils or substrates (gravel or sand in most cases) onto which the effluents are discharged. Some of these systems employ "emergent macrophyte" plants which grow naturally along the riverbanks and in marshlands, but are always conceived as being rooted in the soil or in an inert substrate, as a result of which the surface area of the roots in contact with the water is quite a great deal less than in the case of a floating root system which is bathed all over by the water. Another drawback involved in these systems based on plants which have taken root is how difficult it is to harvest all of the plant matter produced (which contains all of the mineral elements removed from the water), given that solely that part which is above the water line is harvested, the biomass of the roots and of the base of the stems remaining in the soil.

The treatment systems based on the use of floating plants have employed species which are buoyant by nature, such as the water hyacinth (*Eichornia crassipes*) or the Lemnaceae (genuses Lemma, Wolffia, Spirodella, etc.), but have not afforded good results. In the case of the water hyacinth, which is a tropical species that can comprise a hazard in warm climates for the channels and wetlands if any of these plants is allowed to grow out of control as a result of its being fast-spreading; and in mild, continental zones, it dies off in the wintertime. As far as the Lemnaceae and other similar species are concerned, due to the fact that they are not extremely high-yield, their water treatment effect is also scant.

DESCRIPTION OF THIS INVENTION

System for the treatment of wastewater and pollutant effluents based on the use of "emergent macrophyte" water plants which are produced and conditioned especially so that they will remain afloat in channels through which wastewater flows or in lagoons or ponds/tanks into which this water flows. For each case, the macrophyte which best suits the conditions in each individual spot and the type of pollutant(s) to be treated will be employed.

This system can be used for tertiary treatment (removal of eutrophicating mineral elements) in the secondary effluents of conventional treatment systems and can also be used for secondary treatment purposes (breakdown of dissolved organic matter) by means of the microorganisms adhered to the plant root system. This system can also aid in the reduction of the suspended solids on adhering to the root system and thus aid in the attack of the organic matter contained in these solids on the part of the microorganisms attached to the roots of these plants which have a large specific surface area.

This system can also be used for treating eutrophicated agricultural effluents or effluents from industries which discharge wastewater rich in nitrogen and/or phosphorus and/or potassium, as well as for the treatment of spring waters polluted with any or all of these elements.

Some species of emergent plants possess the ability to decontaminate waters laden with some toxic compounds such as phenols and to absorb major quantities of heavy metals, as a result of which this system would also be suitable for treating effluents containing these types of pollutants, provided that the plant species to be employed are suitably selected.

The core of this system is comprised of a floating bed or cover of vegetation formed on the surface of a channel or lagoon, the basic components of which are the plants (species selected from among the "emergent" type which are adapted to the weather conditions of the site in question) which are going to have their root systems and a portion of the base of the stem under the water. Most of the aquatic plants will also have rhizomes (plant reproductive organs from which new sprouts emerge and which contain an abundant amount of carbohydrates as a reserve food supply) which are submerged under the water along with the roots and attached to the base of the stem from which they grow. The entire underwater surface of the plant is large in surface area due mainly to the many roots and radicles, which serve as a base for the attaching of the microorganisms that break down the organic matter, aided by the oxygen supplied to them through the roots pumped from the plant leaves (a property specifically of emergent plants).

Emergent macrophytes, such as rushes (*Juncus subulatus* Forskal, *Juncus maritimus* Lam., *Juncus acutus* L., *Juncus litoralis* C. A. Meyer, *Juncus effusus* L., *Juncus conglomeratus* L., *Scirpus holoschoenus* L., *Scirpus maritimus* L., *Scirpus litoralis* Schrader, *Scirpus triqueter* L., *Cyperus serotinus* Rotth., *Cyperus longus* L., *Schoenus nigricans* L.), bulrushes or reed maces (*Typha angustifolia* L., *Typha latifolia* L., *Typha domingensis* (Pers) Steudel, *Typha minima* Funck in Hoppe), reeds (*Phragmites australis* (Cav.) Trin. ex Steudel) and Sparganiaceae (*Sparganium erectum* L., *Sparganium emersum* Rehmann, *Sparganium angustifolium* Michx and *Sparganium minimum* Wallr) leaf out somewhat at the top and are not as dense as the whole, as a result of which, in order for this type of plants to float and grow, it is necessary to achieve that the portion located under water form a base strong enough and spread out far enough over the surface to allow the leaves and stems to develop above water level and to grow to their natural height, preventing the tendency to fall over into the water and float on its side which a single plant alone would have.

The innovation entailed in the system described hereunder lies in recognizing that plants which are naturally rooted in the soil of the beds of watercourses or along their banks will grow and live out their life cycle floating on top of the water flowing through a channel or which is impounded in a pond or lagoon, provided that the pond or lagoon is deep enough (generally speaking, 25–50 cm. in depth). In short, this involves constructing a floating bed comprised of the underwater plant organs (bases of stems, rhizomes and roots) intertwined naturally as a result of their growth.

For the rapid formation of this floating bed, one must start off using young plants in the growing stage or rhizomes. These plants or rhizomes must be attached to a floating bed structure separately or be spaced apart from one another at a suitable distance (approx. 10–30 cm. apart) so as to allow the roots systems of adjacent plants to intertwine. How fast this cover will form will depend greatly upon how far apart the plants or rhizomes are set into place on the floating bed structure. Some emergent plants (i.e. reeds) have a tube-like stem (hollow stalk) which can float lying on its side in the water without requiring any bed structure and give off shoots from buds located on the nodes and roots.

The formation of the floating cover directly on a watercourse requires that both the floating bed structures and the tube-like stems of the macrophytes, in the case that said macrophytes are employed, must be anchored to prevent the plants from being swept along by the current. A similar process must be employed for ponds or lagoons if there is a possibility that the wind may blow away the plants.

For systems requiring a large number of plants for initially forming the floating cover, the most highly recommended procedure is the use of nursery-grown plants in a substrate suitably weighted so that the plants will stay upright from the very time at which they are set into place. The weight of the substrate including the root-ball of the plant plus the weight of the plant must be slightly heavier than the force exerted on the submerged volume by the water.

Although the type and shape of the floating bed structure may vary to accomplish the desired purposes (growth of the floating cover), generally speaking, it is preferable to use low-density linear bed structures which can be anchored to the sides or to the ends of the channel or to the banks of the ponds or lagoons. In the case of very long channels, the anchoring of linear bed structures, when running lengthwise, can be done in sections. One type of low-density, linear, floating bed structure easy to obtain in sufficient quantities at a reasonable price is that of 12 mm or 16 mm low-pressure polyethylene tubing commonly used for drip irrigation.

To facilitate the ready placement of the plants or rhizomes on the floating bed structures, each plant must be delivered on site at the channel with the attachment system incorporated. As a plant attachment system, fine wire (smaller than 1 mm-gauge) with one end wound around the root system or the leaves of the plant and the other ending in a clip or similar means of ready attachment or left free may be used for attaching the plants readily to the floating bed structure.

Apart from its water treatment effect, this system affords the possibility of producing biomass for energy-related or industrial purposes in an amount far greater than any crop-raising done on land. In the case of reed mace, an annual yield of 2.23 kg/m2 of dry matter is estimated for the part of the plant growing above water, which would be the same as saying that a quantity of biomass possessing a heat capacity approximately equal to that which can be supplied by 1 liter of petrol, is produced. As far as the sugars and starch contained in the rhizomes are concerned, the annual production can be estimated at 1 kg/m2. One use for the carbohydrates contained in the rhizomes would consist of the manufacture of ethanol.

Some of this system's major advantages over the treatment systems which employ emerging macrophytes rooted in the soil or substrate include its being:

More economical to get under way.

Easier to get under way, given that this can be done on the channel or pond proper without requiring any draining and regardless of the depth of the water layer.

Greater treatment capacity as a result of the root system being fully in contact with the water.

Easy to harvest all of the biomass grown in those cases in which one wishes to remove mineral elements fixed by the plants or to make use of the biomass formed for energy-producing or industrial purposes.

In the event that plants producing starchy rhizomes (i.e. bulrushes, etc.) are used, this system provides for ready harvesting of these rhizomes in conjunction with the portion of the plants located above water level, this being something which is more difficult to do when the rhizomes are located down under the soil on the channel bottom or in a bed of peat or gravel, as is normally the case in the conventional systems. This system affords the possibility of using the rhizomes in industry, mainly for the production of starch or the derivatives thereof, one of which is ethanol.

DETAILS OF THE EMBODIMENT

A description is provided in following, in the form of an example for illustrative purposes, of the embodiment of a wastewater treatment system for a population of 1,000 inhabitants. This description is provided based on the premise that 2.5 m$^2$ of surface area of floating filter comprised of bulrush (*Typha latifolia*) plants is required for the treatment of the wastewater generated by each inhabitant.

Building the Channel. Based upon the aspects set forth hereinabove, a channel or pond surface of 2,500 m$^2$ (0.25 hectares) would be required for installing the floating filter. This process would begin with the pertinent earthwork, ensuring that the bottom of the channel were not graded on more than a 1° slope, installing the pertinent chutes if it were to be necessary to make provision for uneven terrain. The channel may vary in width depending upon the lay of the land, it being recommended that it measure 2m–3m in width so as to provide for the convenient harvesting of the biomass grown. The excavation must be done to a minimum depth of 50 cm, the edges be raised to approx. 30 cm above the surface of the terrain in order to prevent the falling in of soil or other objects. Both the sides and bottom of the channel must be covered with a sheet of plastic or any waterproofing component to prevent the plants from taking root. The channel can also be built out of concrete or prefabricated components, although this can make the building process most expensive.

So that the water layer will always be a minimum of 30 cm in height, depending upon the slope of the channel, locks or sluices are to be installed at the required distances. Hence, in order to keep the water at depths of 30 cm–50 cm. (for example) in a channel which is sloped at a 1° angle at the bottom, sluices measuring 50 cm in height should be installed every 20 m. For the case of a width of 2.5 m, a total length of 1,000 m would be necessary, which could be built following the natural course of the drainage flow.

Preparation of the Plants from Seeds. The bulrush seeds are to be initially sown in flats and, following approximately one month of growth, are to be transplanted to 4×4 seedling starter pack containers 7 cm in depth filled with a substrate comprised of peat-topsoil-sand in a 1-1-2 proportion in volume. When preparing the seedling starter pack containers with the pertinent substrate, a 0.5 mm-gauge annealed iron wire measuring 15–20 cm in length bent at a right angle approx. 5 mm from the lower tip is inserted to facilitate the intertwining of the root-ball of the plant. In addition to providing the iron which the young plant needs for growth, this wire is going to serve as the basis for attaching the plant to the floating bed structure when it is being put into place on the channel. Following 2–3 month of growth, the plants will be ready to be moved to the channel. The best time of year for setting them out is in the springtime, in order to foster the forming of the floating cover by taking advantage of the active growth period.

Setting the Plants Out on the Channel. As the floating bed structures, 12 mm lowpressure polyethylene tubing (of the type used for drip irrigation) is to be used and laid along each section of the channel, then secured to both ends. To achieve a ready formation of the floating cover, it is recommended that the floating bed structures be spaced approx. 50 cm apart. In a channel 2.5 m in width, it would be necessary to install 5 lengthwise bed structures. The initial spacing of the plants on each bed structure would be approx. 25 cm. apart. The plants, which are to already be fitted with the device for securing them to the bed structure (wire wound around the root-ball of the plant), are to be secured by means of an easy-to-handle system, the root-ball of each plant serving to weight the plants down at the bottom to keep them upright. Depending on the temperature conditions 0f the area in question, the cover may take 3–6 months for full growth. For a relatively fast first planting, approx. 8–10 plants per $m^2$ will be required. The wire employed will remain intact long enough to allow the floating cover to grow. After a certain length of time, the wire completely breaks down, at which time the polyethylene tubing bed structures can be removed leaving the cover comprised solely of plant matter in place.

Removing the Biomass. At the end of the growing period, the portion of the plants located above water level can be cut and all or part of the floating cover removed, although it can be left in place for several years. The dry biomass of the part above water level can be used for energy-producing purposes (burning), for crafts (mainly chair seats), as building insulation, as a raw material for paper stock or as a binder for making lightweight panels used in the construction industry. The biomass located under water contains rhizomes rich in starch, the industrial use of which depends upon the total volume of the yield and upon the existence of the pertinent processing industry.

What is claimed is:

1. A process for treating wastewater comprising the steps of providing said wastewater, providing a plurality of emergent macrophyte aquatic plants on the surface of said wastewater, said emergent macrophyto aquatic plants having roots, in such a manner that the roots of said emergent macrophyte aquatic plants are fully in contact with said wastewater, and allowing said roots to develop to provide a floating bed consisting essentially of said emergent macrophyte aquatic plants with said roots fully in contact with said wastewater.

2. A process according to claim 1 wherein said emergent macrophyte aquatic plants are selected from the group consisting essentially of rushes, bulrushes or reed maces, reeds and Sparganiaceae.

3. A process according to claim 1 wherein said step of providing a plurality of emergent macrophyte aquatic plants comprises maintaining one or more of said plants on said surface by attachment to a removable support.

4. A process according to claim 3 wherein said support floats.

5. A process according to claim 3 wherein said removable support comprises low-pressure polyethylene tubing, and said process further comprises securing said plants to said tubing by wire that breaks down and removing said tubing from said plurality of plants after said wire breaks down.

6. A process according to claim 1 wherein the depth of said wastewater is at least about 25 cm.

7. A process according to claim 1 wherein the depth of said wastewater is about 25 cm–50 cm.

8. A process for treating wastewater comprising the steps of providing said wastewater, providing a plurality of emergent macrophyte aquatic plants on the surface of said wastewater, said emergent macrophyte aquatic plants having roots, in such a manner that the roots of said emergent macrophyte aquatic plants are fully in contact with said wastewater, and allowing said roots to develop to provide a bed of said emergent macrophyte aquatic plants with said roots fully in contact with said wastewater, wherein said step of providing plants comprises maintaining one or more of said plants on said surface by attachment to a removable support and wherein at least a portion of said support breaks down over time releasing said plants from the remainder of said support.

9. A process for treating wastewater comprising the steps of providing said wastewater, providing a plurality of emergent macrophyte aquatic plants on the surface of said wastewater, said emergent macrophyte aquatic plants having roots, in such a manner that the roots of said emergent macrophyte aquatic plants are fully in contact with said wastewater, and allowing said roots to develop to provide a bed of said emergent macrophyte aquatic plants with said roots fully in contact with said wastewater, wherein said step of providing plants comprises maintaining one or more of said plants on said surface by attachment to a removable support and further comprising the step of removing said support when said plants are able to float on said surface.

10. A process for treating wastewater comprising the steps of providing said wastewater, providing a plurality of emergent macrophyte aquatic plants on the surface of said wastewater, said emergent macrophyte aquatic plants having roots, in such a manner that the roots of said emergent macrophyte aquatic plants are fully in contact with said wastewater, and allowing said roots to develop to provide a bed of said emergent macrophyte aquatic plants with said roots fully in contact with said wastewater, wherein said step of providing plants comprises maintaining one or more of said plants on said surface by attachment to a removable support and wherein said support maintains its integrity at least until the roots of said plants intertwine.

11. A process for treating wastewater comprising the steps of providing said wastewater and providing a floating bed consisting essentially of emergent macrophyte aquatic plants on the surface of said wastewater with the roots of said emergent macrophyte aquatic plants fully in contact with said wastewater.

* * * * *